US008776074B1

(12) United States Patent
Heisler et al.

(10) Patent No.: US 8,776,074 B1
(45) Date of Patent: Jul. 8, 2014

(54) METHODS, DEVICES AND SYSTEMS FOR COORDINATING AND OPTIMIZING RESOURCES

(75) Inventors: Jeffrey H. Heisler, Lumberton, NJ (US); Michael J. DiMario, Skillman, NJ (US); Janet Barbera, Voorhees, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 657 days.

(21) Appl. No.: 13/005,123

(22) Filed: Jan. 12, 2011

Related U.S. Application Data

(60) Provisional application No. 61/297,619, filed on Jan. 22, 2010.

(51) Int. Cl.
G06F 9/46 (2006.01)
G06F 9/48 (2006.01)
G06F 9/50 (2006.01)
G06F 9/52 (2006.01)

(52) U.S. Cl.
CPC ............ *G06F 9/4881* (2013.01); *G06F 9/4806* (2013.01); *G06F 9/5016* (2013.01); *G06F 9/52* (2013.01)
USPC .......................................... 718/104; 718/103

(58) Field of Classification Search
CPC ... G06F 9/4881; G06F 9/4806; G06F 9/5016; G06F 9/52
USPC ......................................................... 718/104
See application file for complete search history.

(56) References Cited

U.S. PATENT DOCUMENTS

| 7,461,149 | B2* | 12/2008 | Gasca et al. ................... 709/226 |
| 7,783,759 | B2* | 8/2010 | Eilam et al. ................... 709/226 |
| 2006/0173724 | A1* | 8/2006 | Trefler et al. ...................... 705/8 |
| 2008/0256549 | A1* | 10/2008 | Liu et al. ........................ 718/106 |
| 2008/0306798 | A1* | 12/2008 | Anke et al. .......................... 705/8 |

OTHER PUBLICATIONS

DiMario, Michael et al.; "System of Systems Collaborative Formation"; Systems Journal, IEEE, Sep. 1, 2009; 3:3, p. 360-368.
Saaty, Thomas L.; "Fundamentals of the Analytic Network Process"; ISAHP 1999, Aug. 12-14, 1999, p. 1-14.
"The Analytic Network Process for Decision-Making"; Superdecisions.com, at least as early as Jan. 12, 2011.

* cited by examiner

*Primary Examiner* — Lewis A Bullock, Jr.
*Assistant Examiner* — Kevin X Lu
(74) *Attorney, Agent, or Firm* — Howard IP Law Group, PC

(57) ABSTRACT

A representative method for coordinating and optimizing resources in the completion of a set of tasks includes providing multiple task types defined for a scenario and task priorities; combining multiple solutions of the respective multiple task types into multiple candidate decisions; determining candidate scores for the respective multiple candidate decisions based on the combined multiple solutions of the respective multiple task types; determining an optimal candidate score based on the candidate scores from the respective multiple candidate decisions and task priorities; and selecting an optimal response to a given scenario based on the candidate decision based on having the determined optimal candidate score.

12 Claims, 8 Drawing Sheets

METHODS, DEVICES AND SYSTEMS FOR COORDINATING AND OPTIMIZING RESOURCES

CROSS REFERENCE TO RELATED APPLICATIONS

This application claims the benefit of U.S. provisional application entitled, "Analytical Hierarchy Process For Automated Multi-Mission Resource Allocation," having Ser. No. 61/297,619, filed on Jan. 22, 2010, the entire disclosure of which is incorporated herein by reference.

TECHNICAL FIELD

The present disclosure relates to computing systems. More particularly, the present disclosure relates to complex decision computing methods, systems and devices.

BACKGROUND

Many decision computing systems are designed to resolve a single task but not numerous tasks in a complex environment. For example, there are no decision computing systems that automate in real time the process of assigning resources to a multi-dimensional problem in any environment that could benefit from collaborative resource allocation, such as determining which sensors, weapons and timelines can be coordinated within a Naval force to optimize the total application or the coordination of first responder resources such as ambulances, fire, police assets in a large disaster scenario.

Accordingly, an improved decision computing system is desirable in the art that would improve upon the conventional decision computing system.

SUMMARY

A representative method for coordinating and optimizing resources in the completion of a set of tasks includes providing multiple task types defined for a scenario and task priorities; combining multiple solutions of the respective multiple task types into multiple candidate decisions; determining candidate scores for the respective multiple candidate decisions based on the combined multiple solutions of the respective multiple task types; determining an optimal candidate score based on the candidate scores from the respective multiple candidate decisions and task priorities; and selecting an optimal response to a given scenario based on the candidate decision based on having the determined optimal candidate score.

Other systems, devices, methods, features of the disclosure will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems and methods are discussed with reference to the figures. Although these systems and methods are described in detail, they are provided for purposes of illustration only and various modifications are feasible. In general, the disclosed coordinating and optimizing resources system includes automated real-time planning/re-planning of asset tasking for the purpose of adapting to mission failures and real time events. An Analytic Hierarchy Process (AHP) is applied to the selection of overall resource responses based on a given set of tasks. The coordinating and optimizing resources system generates tasks to be completed as a first level of the response. The coordinating and optimizing resources system continuously runs to determine the best course of action given a set of tasks and solutions to each task. The solutions are judged against each other using a weighted scoring method.

Figure 1:
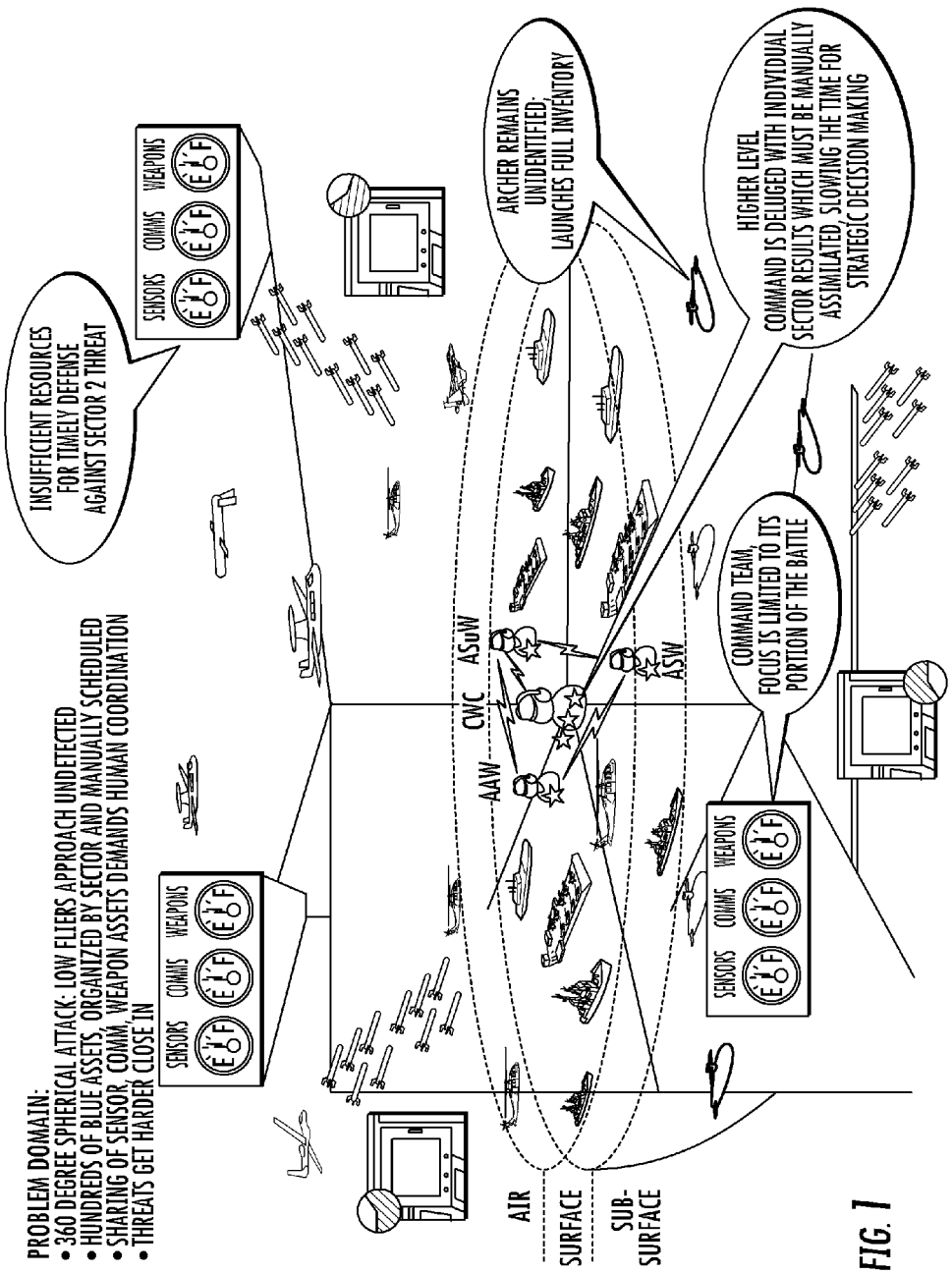
FIG. 1 is an example of a scenario that a coordinating and optimizing resources system can be used in the completion of a set of tasks, such as, forest fire, floods, electrical grid black outs, etc.

FIG. 1 is an exemplary scenario that a coordinating and optimizing resources system 225 (FIG. 2) can be used for the completion of a set of tasks, such as, forest fires, floods, electrical grid black outs, etc. In this example, the scenario is a military battle where the coordinating and optimizing resources system controls military assets in real-time to provide an optimal response to multiple tasks during the military battle. The military assets include jet fighters, battleships, aircraft carriers, helicopters, submarines, marines, etc. The coordination and optimizing resources system 225 (FIG. 2) is further described in connection with FIGS. 2-8.

Figure 2:
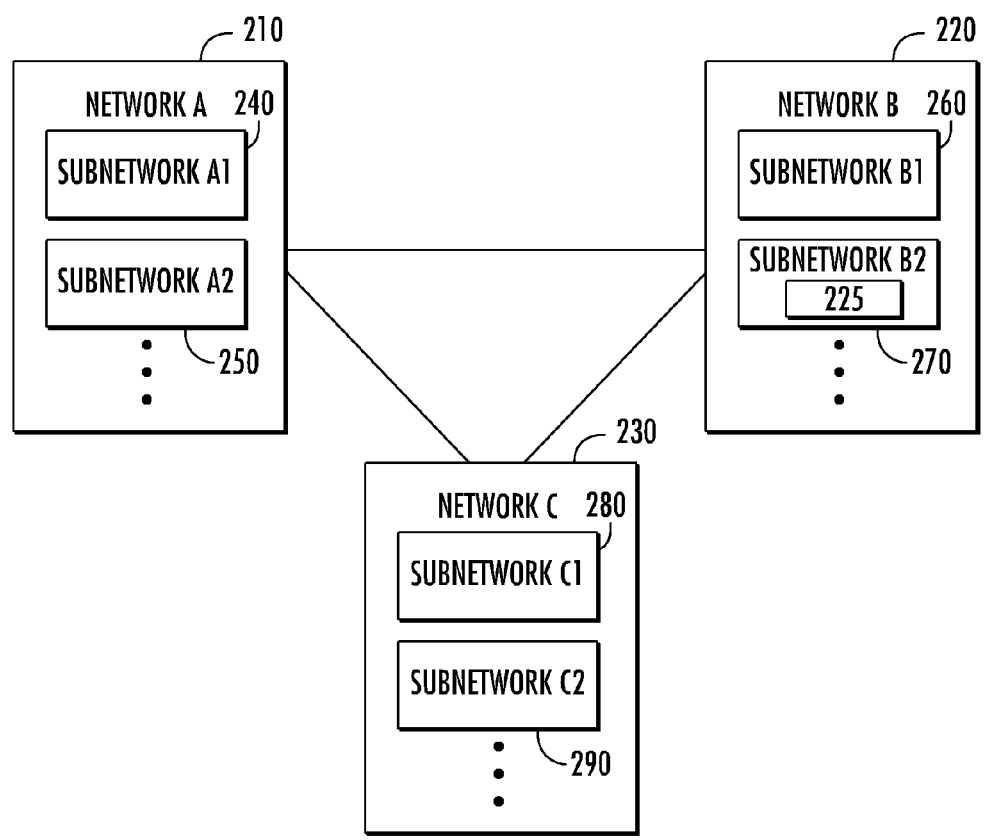
FIG. 2 is a block diagram that illustrates an example of multiple networks and sub-networks associated with a coordinating and optimizing resources system, such as that shown in FIG. 1.

FIG. 2 is a block diagram that illustrates multiple networks 210, 220, 230 and sub-networks 240, 250, 260, 270, 280, 290 associated with the coordinating and optimizing resources system 225. In this example, the coordinating and optimizing resources system 225 includes network A 210, network B 220, and network C 230. The networks 210, 220, 230 can represent a section of the military assets (FIG. 1), such as the air force, navy, and army. Each network 210, 220, 230 includes multiple subnetworks 240, 250, 260, 270, 280, 290. For example, the navy can include subnetworks of fleets of aircraft carriers or fleets of submarines. The coordinating and optimizing resources system 225 can be implemented at a central location, such as network B 220, or implemented in a distributed manner among the networks 210, 220, 230.

Figure 3:
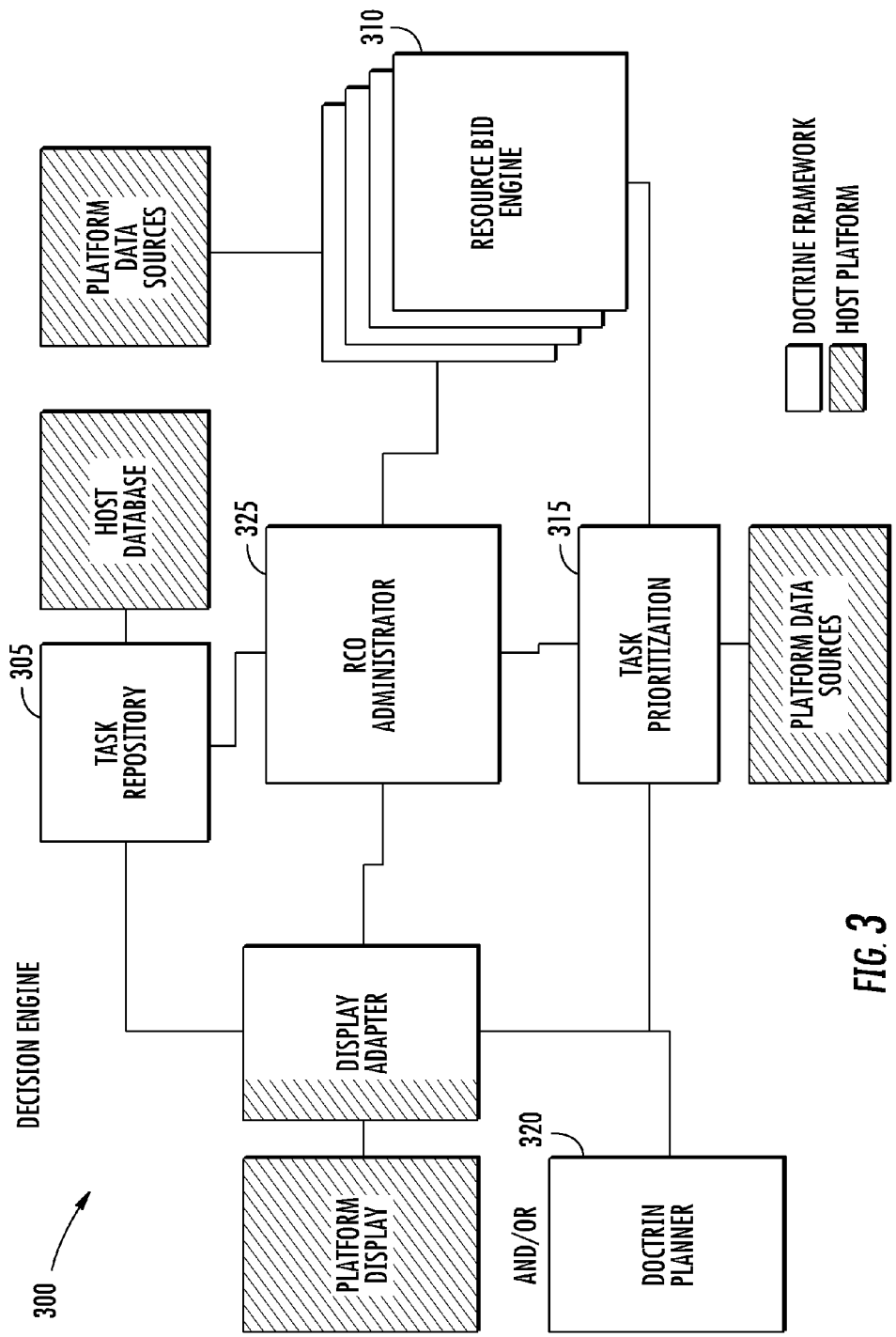
FIG. 3 is a block diagram that illustrates an example of a statistical decision engine architecture in accordance with an embodiment of the disclosure.

FIG. 3 is a block diagram of an example architecture of a decision engine 300 in accordance with an embodiment of the disclosure. The decision engine 300 is part of the coordinating and optimizing resources system 225. The decision engine 300 includes a task repository 305 that maintains high level task types and their associated criterion and weights. Resource bid engine 310 maintains bids that have been received for given tasks and dated bids that are no longer valid and maintains the task response status of ongoing tasks. Task prioritization 315 prioritizes the incoming tasks. Doctrine planner 320 allows the input of several weighting schemes to be selected through a triggering method (operator action, doctrine, etc.). Resource coordination optimizer (RCO) 325 performs the evaluation of bids and determines an optimized course of action based on selected preferences from a user, such as a military Commander in the scenario presented in FIG. 1.

As illustrated by FIG. 3, the decision engine 300 can be integrated with a host management system that includes a host database 330, platform data sources 335, 340, and platform 345. For example, the host database 330 can determine the tasks to be performed and forward them to the task repository 305. The platform data sources 335 can gather all responses to a given task through its existing communications networks and databases and provide that information to the resource bid engine 310.

The platform display 345 is coupled to the display adapter 350 to provide a user interface for the input of data related to task priorities, solution preferences. The RCO 325 can provide recommended courses of action to the platform display 345 for display.

Prior to events (e.g., a military battle), the user can assign preferences for the various task types using a comparison software or program that can generate a set of weights for each potential task type. As events transpire and a plan is put in place, task responses can be generated by agents representing the task solutions. As the task solutions are generated, agents representing resource providers can provide bids on those tasks with indications of ability to perform and resource loading. Based on the preferences already defined by the user as to ability vs. resource comparisons, the coordinating and optimizing resources system 225 provides recommended courses of action that can best meet a user's intent while satisfying the selected preferences.

Figure 4:
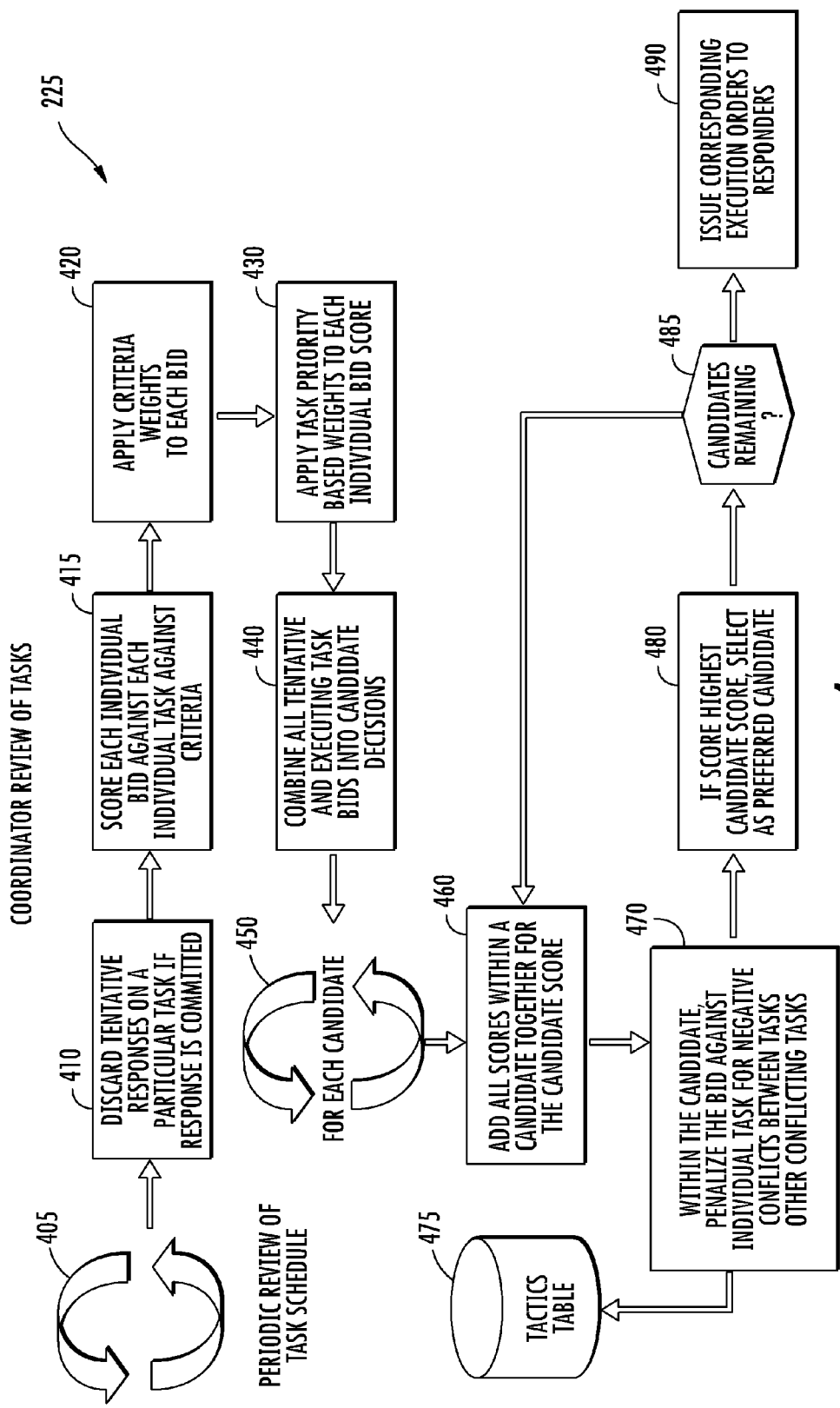
FIG. 4 is a flow diagram that illustrates an example of a coordinating and optimizing resources system in accordance to an embodiment of the disclosure.

FIG. 4 is a flow diagram of the coordinating and optimizing resources system 225 in accordance to an embodiment of the disclosure. The task repository module 305 receives or is provided with multiple task types defined for a scenario and task priorities. Beginning with blocks 405 and 410, the RCO 325 performs a periodic review of task schedules (e.g., 5 seconds periodic review) and ignores tentative responses on a particular task if a response has been committed. The RCO 325 can ignore the tentative responses by deleting them from the database or mark them as non-committed response.

In blocks 415 and 420, the RCO 325 scores each individual solution against each individual task using a set of at least one criterion and applies the weights associated to the high level task to the scores of an individual solution. In block 430, the RCO 325 applies task weights priority to each individual bid score based on the task priorities criteria weights. In block 440, the RCO 325 combines all possible combinations of solutions into candidate decisions.

In block 450 and 460, the RCO 325 determines a candidates score for each candidate based on the combined solutions. For example, the candidates score can be determined by adding all scores together within a candidate. In block 470, the candidate score can also be penalized for, e.g., bids against individual task with negative conflicts between tasks and other conflicting tasks. Although not shown, the candidate scores can be rewarded for the candidate decisions for positive interference between the tasks and other complementary tasks. Tactics table 475 maintains the information on possible positive and negative interactions between potential solutions that can be used to reward or penalize a candidate solution that encompasses those interactions.

In blocks 480 and 485, the RCO 325 selects the candidate with the highest candidate score and blocks 460, 470, 480 are repeated from the remaining candidates. In block 490, if no further candidates are available for review, the RCO 325 issues the candidate with the overall highest score as the course of action to execute.

Real time inputs include a prioritized set of tasks and potential solutions to those tasks that are considered "Bids" to barter to perform a given task. The task request contains the high level task type it is a part of and any conflicts that are known. The bid is made up of the normalized score to the criteria associated with the high level task type. The bids can either be generated by agents that simulate the capabilities of the bidder or the bidder themselves.

A-priori to making decisions, the weights for each criterion is inputted to be used by the RCO 325 in order to choose between alternatives. Users can define their preferences in a comparison between individual criteria for a specific task type using the comparison software/program. Weights can then be generated based on the comparison. The scores are then normalized for a given criterion and the average across becomes the weight for that criterion. Prior to decision making, the user may set up several sets of weights for a given task that can be selected given the current operational situation. This allows the user to tailor responses given to the desired situation. Some of the blocks in the flow diagram of a coordinating and optimizing resources system 225 are further described in connection with FIGS. 5-7.

Figure 5:
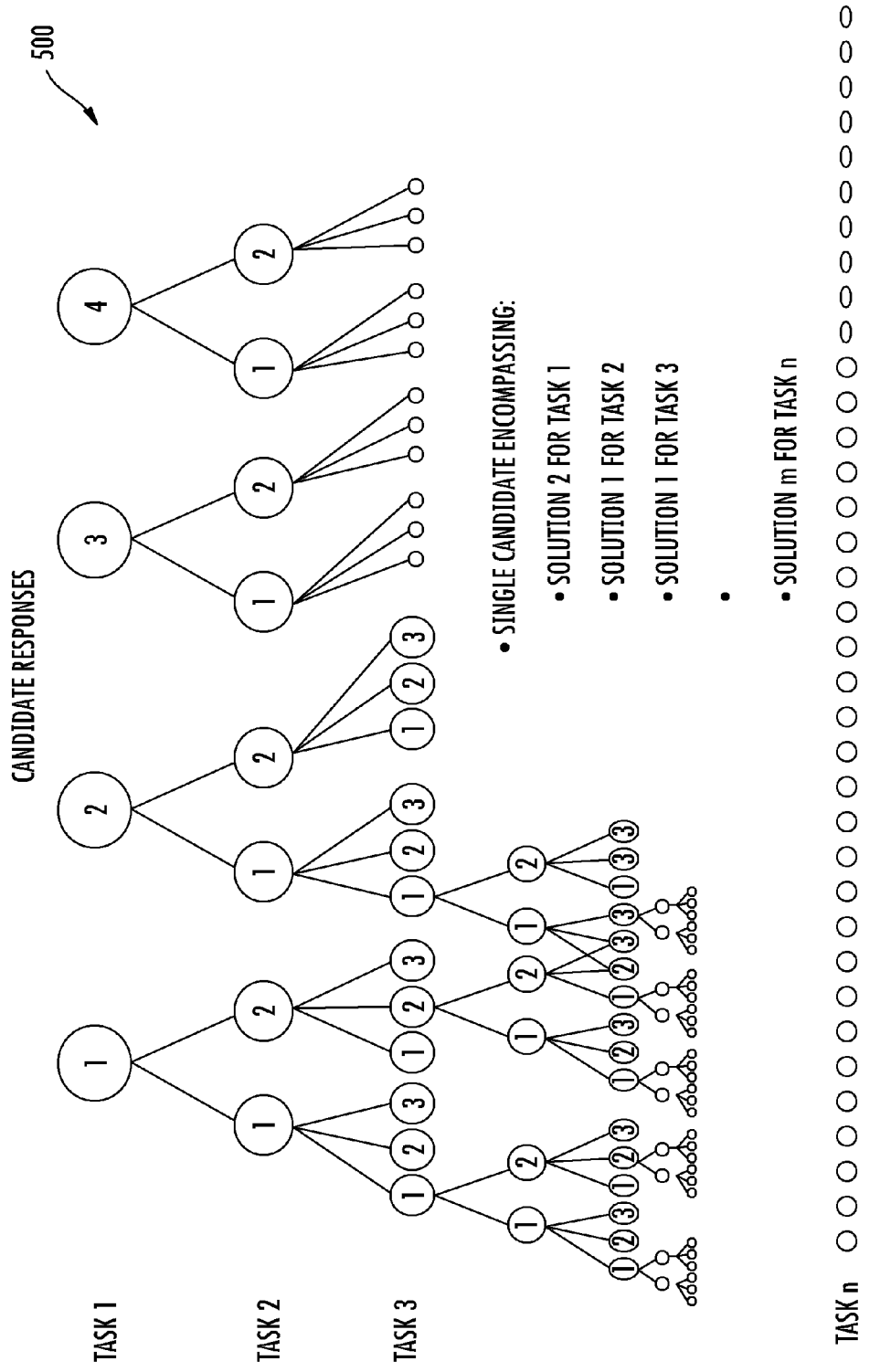
FIG. 5 shows an example of a candidate formation in accordance with an embodiment of the disclosure.

FIG. 5 shows an example of a candidate formation 500 in accordance with an embodiment of the disclosure. Assume that there is a set of task types T. Each task type is a high level resource request type that can be used as a structure for a specific request of that type. For example, resource type, $T_n$, might be a Communications channel for broadcasting video surveillance data, while a specific resource of that type $t_{nm}$ could support UAV tail number 1234 surveillance mission. For each $T_n$ within T, there is an associated set of criteria $C_{Tn}$ which can be used to judge potential solutions to the task type.

For example, if $T_n$ is describing broadcast channel, the set of $C_{Tn}$ that may be used to choose between solutions may include, but not limited to % total Bandwidth used, transfer rate, and time to re-configure. Each criterion has a weight $$w_{C_{T_n j}}$$

associated with it such that a score can be generated for a given solution against a given task. Each task type $T_n$ has an associated set of criteria and weights. The criteria and weights are specific to a Task type. Any subtask of a given task type will use the same set of weights. A specific resource of that type $t_{nm}$ can be calculated in Equation 1 as follows:

$$t_{nm} = \sum_{1}^{j} S_{mij} * W_{C_{T_nj}}$$ (Eq. 1)

where $S_{mij}$ refers to a normalized score of an individual solution i to particular task m for a defined criterion j.

The overall force mission becomes a set of tasks made up of the sum of all $t_{nm}$. Candidate solutions to the entire problem are made up of all possible combinations of potential solutions to the given tasks. The candidate solution $CS_i$ is a particular set of solutions $S_{mi}$ for all m. $CS_i = \{S_{1a}, S_{2b}, S_{3c}, \ldots S_{mz}\}$.

The candidate score can be calculated using Equation 2 as follows:

$$CS_i = \sum_{1}^{m}(W_{t_{nm}} \times \sum_{1}^{j} S_{mij} * W_{CT_{nj}})$$ (Eq. 2)

where $W_{t_{nm}}$ refers to a normalized weight of an individual task based on the priority of that individual task. The selected course of action becomes the candidate solution with the highest candidate score.

Figure 6:
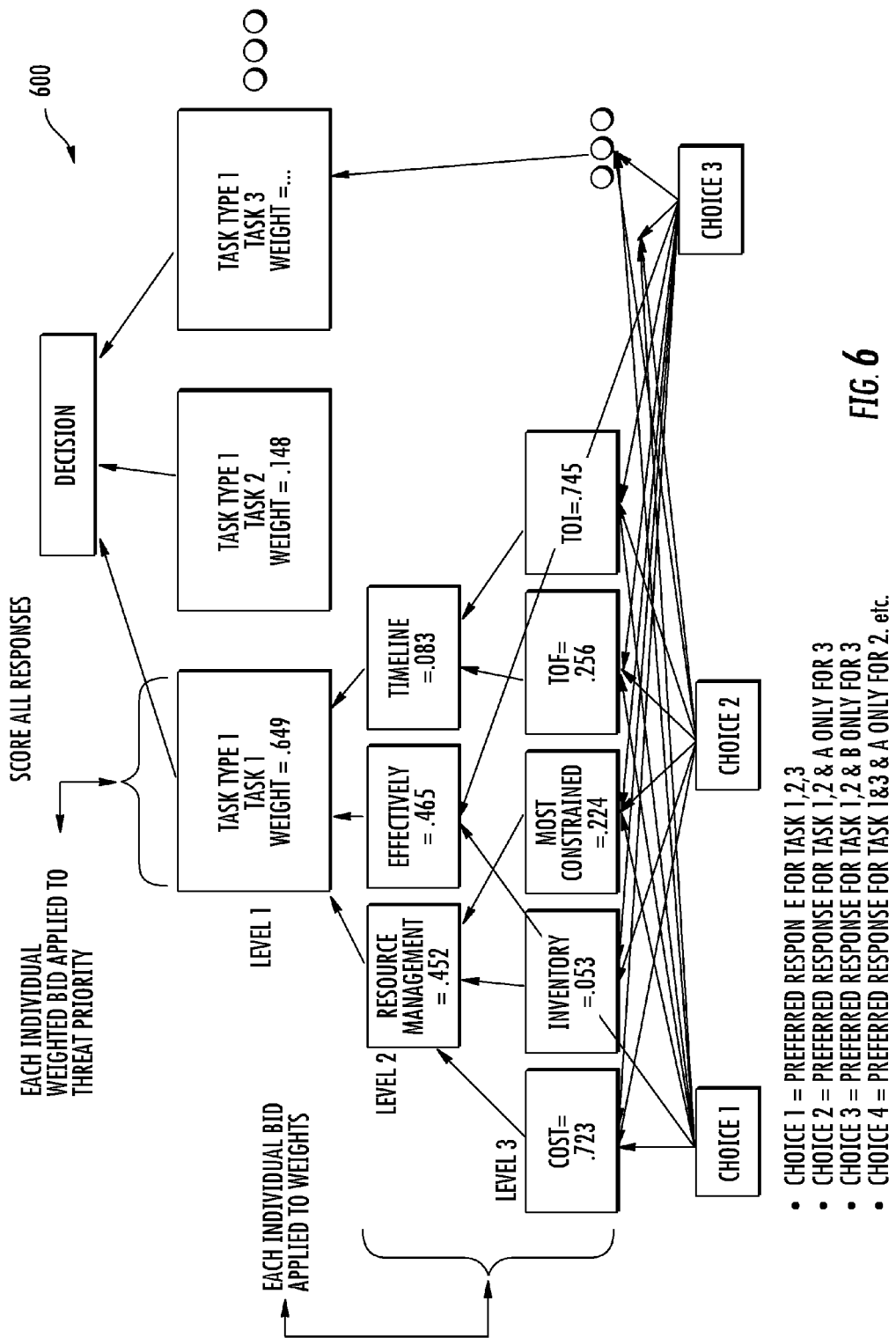
FIG. 6 shows an example of a score of responses in accordance with an embodiment of the disclosure.

FIG. 6 shows an example of a scoring 600 of responses in accordance with an embodiment of the disclosure. This example is similar to a "Traveling Salesman" problem, which is to determine which combinations of actions can yield the highest score. The number of combinations grows exponentially and can quickly become unmanageable in its current state.

There are several methods that are combined in order to significantly reduce the computational time, such as a branch and prune technique. As such, a given candidate $CS_i$ is broken up into a set up sub-candidates $CS_{i1}, CS_{i2}, CS_{i3}, \ldots CS_{il}$ that contain a subset of the overall tasks to be completed. They are broken up based on the priorities of the individual tasks from most important to least with the break point defined as some bound, k, that can provide enough complexity while maintaining a reasonable amount of computational time. The candidate $CS_i$ and sub-candidates $CS_{i1}$ can be calculated using equations 3 and 4 as follows:

$$CS_{il} = \sum_{1}^{k}(W_{t_{nk}} \times \sum_{1}^{j} S_{kij} * W_{CT_{nj}})$$ (Eq. 3)

$$CS_i = \sum_{1}^{l}(CS_{il})$$ (Eq. 4)

The various candidates are then compared between sub-candidates $CS_{i1}$. The highest score for the $CS_{i1}$ is the primary branch to go further. All candidates that do not share the first set of solutions in their candidate set are discarded and only candidates that are along that branch of solutions are selected to compare further.

For example, there may be 20 tasks to be completed that are listed in priority order: defeat threat 123, defeat threat 234, support combat air support (CAS) 3, support combat search and rescue (CSAR) 8, support communications with Unmanned aerial vehicles (UAVs) 1234, defeat threat 345, etc. If there are 4 possible solutions for each task, there are approximately 4,019,988,717,840,603,673,710,821,376 possible candidate solutions to all tasks. By optimizing only the first 3 or 4 tasks, there are now only 331,776 candidates to look at which is only 8e-21% of the original problem. So tasks defeat threat 123, defeat threat 234, support CAS 3, support CSAR 8 will be optimized first, then only solutions for tasks support communications UAV 1234, defeat threat 345, etc. can be optimized, assuming the solution for the higher priority tasks are not decided.

Figure 7:
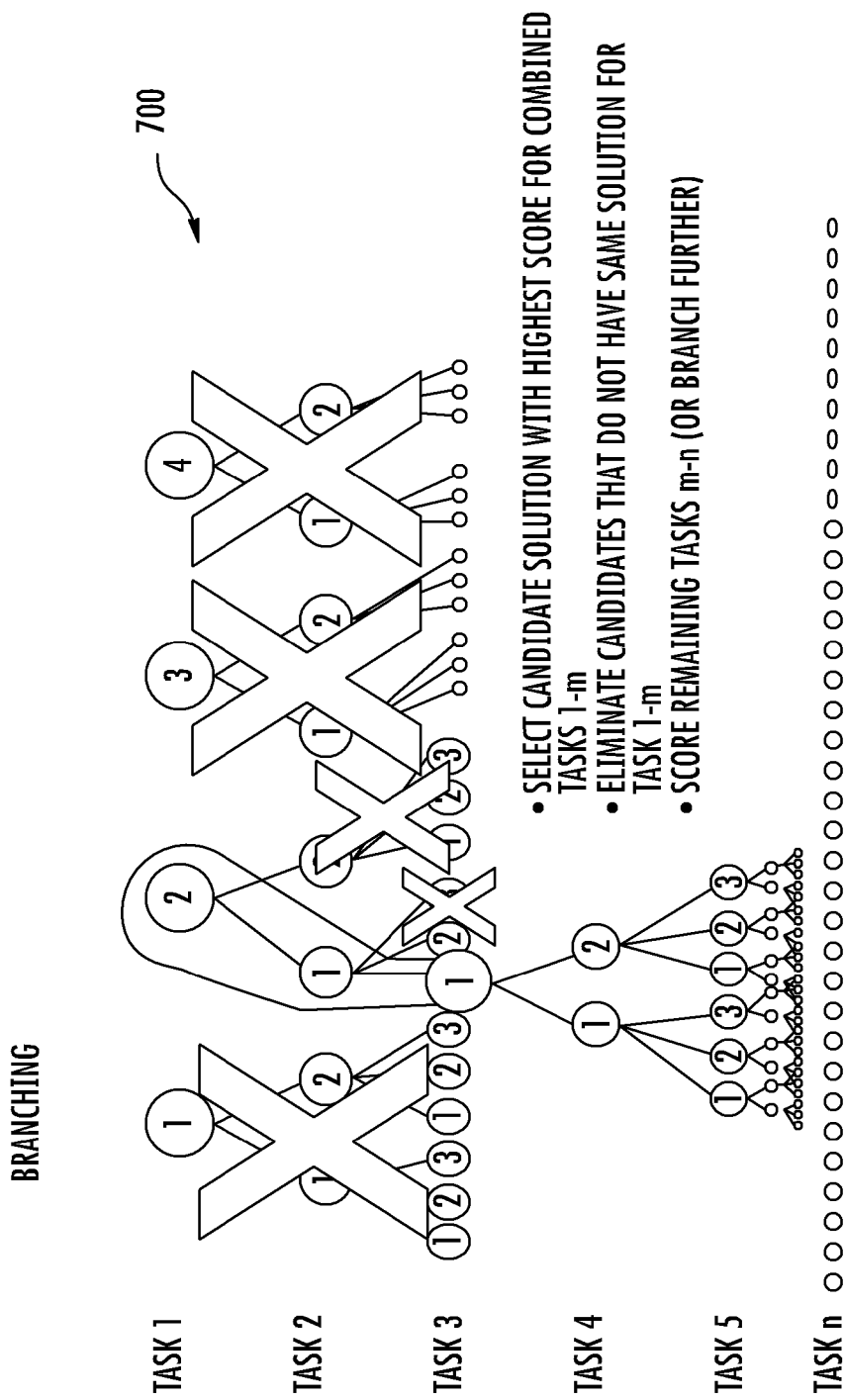
FIG. 7 shows an example of a branching of candidate responses in accordance with an embodiment of the disclosure.

FIG. 7 shows an example of a branching 700 of candidate responses in accordance with an embodiment of the disclosure. The method of branching 700 reduces computational time by performing the scoring of individual solutions to individual tasks before separation into candidates. Before solutions are grouped together to form the candidates, $t_{nm}$ is computed for each potential solution. The individual candidates are then sets of $t_{nm}$ scores, as represented in Equation 5 below.

$$C_{Si} = \{t_{n1a}, t_{n2b}, t_{n3c}, \ldots t_{nmz}\}$$ (Eq. 5)

Any selection of actions can have some level of interference between actions taken on disconnected tasks. Selection of a particular radio to fulfill task A may cause interference with the signal being received on the same frequency that is being used for task B. In order to account for this, within a branching, when evaluating the candidate, a conflict check is performed to determine if the total solution can create conflicts between the solutions of individual sub-tasks. If a conflict is recognized, the overall score of that branched solution is penalized. The purpose of this is to allow other solutions that may not be the local optimum for a particular task be selected if it results in a higher possibility of an overall optimum. However, if no other suitable solutions exist without conflicts, a solution can still be generated that can provide the best possible solution.

Figure 8:
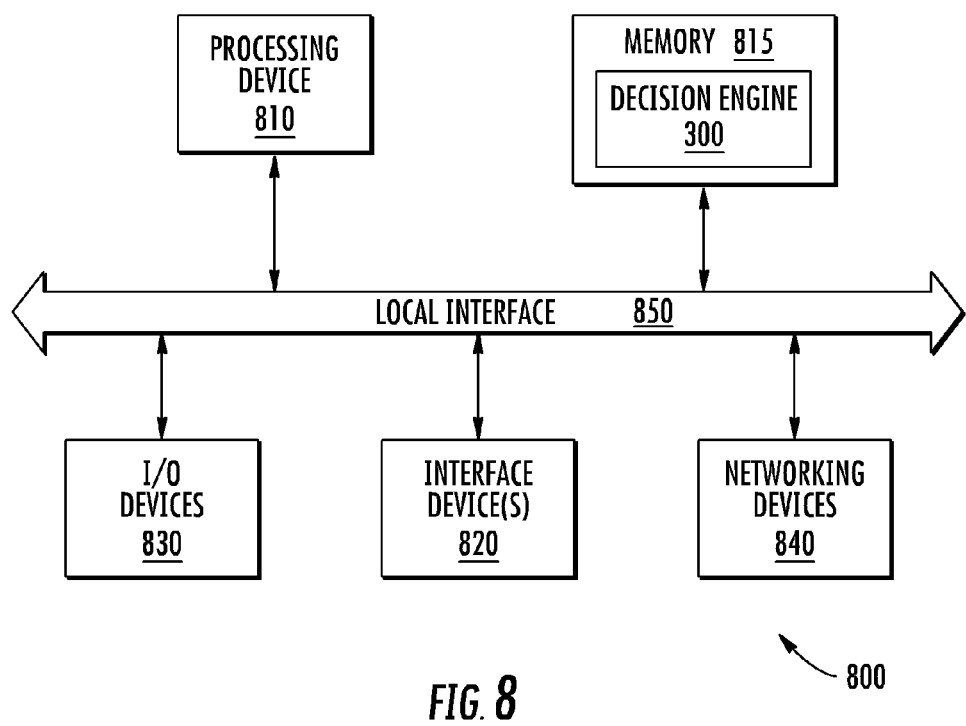
FIG. 8 is a block diagram that illustrates an example of an architecture of a computing device that can be used to implement a coordinating and optimizing resources system.

FIG. 8 is a block diagram illustrating an exemplary architecture for a generic computer 800 that can be used to implement the coordinating and optimizing resources system 225. As indicated in FIG. 8, the computing generic computer 800 comprises a processing device 810, memory 815, one or more user interface devices 820, one or more I/O devices 830, and one or more networking devices 840, each of which is connected to a local interface 850. The processing device 810 can include any custom made or commercially available processor, a central processing unit (CPU) or an auxiliary processor among several processors associated with the generic computer 800, a semiconductor based microprocessor (in the form of a microchip), or a macroprocessor. The memory 815 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 820 comprise those components with which the user (e.g., Commander) can interact with the generic computer 800. Where the generic computer 800 comprises a server computer or similar device, these components can comprise those typically used in conjunction with a PC such as a keyboard and mouse.

The one or more I/O devices 830 comprise components used to facilitate connection of the generic computer 800 to other devices and therefore, for instance, comprise one or more serial, parallel, small system interface (SCSI), universal serial bus (USB), or IEEE 1394 (e.g., Firewire™) connection elements. The networking devices 840 comprise the various components used to transmit and/or receive data over networks (not shown), where provided. By way of example, the networking devices 840 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 815 normally comprises various programs (in software and/or firmware) including an operating system (O/S) (not shown) and the decision engine 300. The O/S controls the execution of programs, and provides scheduling, input-output control, file and data management, memory management, and communication control and related services. The decision engine 300 was described earlier in connection with FIG. 3.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed is:

1. A method for coordinating and optimizing resources in real time for the completion of a set of tasks comprising:
   providing multiple task types defined for a scenario and task priorities each task type representing a high level request used as a structure for a specific request to complete a task in the set of tasks;
   determining a current operating condition;
   defining a plurality of solutions for each task in the set of tasks based on the task type of each task;
   combining a respective solution associated with each task in the set of tasks, to define a candidate decision for the set of tasks;
   determining a plurality of candidate decisions based on all possible combinations of the plurality of solutions for each task of the set of tasks;
   determining candidate scores for each of the plurality of candidate decisions, the candidate score being the sum of the scores of the plurality of solutions in the corresponding candidate decision, comprising:
      determining the score for each solution in the respective candidate decision using a set of one to n criteria based on the task type of the task that the solution performs and applying weights to each criterion of each solution, wherein weights are based on a task priority assigned to the task associated with each solution and the current operating condition;
   determining an optimal candidate decision as the candidate decision of the plurality of candidate decision with the overall highest candidate score, and
   selecting and executing the determined optimal candidate decision for the current operating condition,
   wherein the method is implemented by a computing device comprising a processing device and memory which has instructions that are executed by the processing device.

2. The method as defined in claim 1, further comprising penalizing a candidate score when negative conflicts are detected between the plurality of solutions and other conflicting tasks.

3. The method as defined in claim 1, further comprising rewarding a candidate score when positive interferences are detected between the plurality of solutions and other complementary tasks.

4. The method as defined in claim 1, wherein determining the optimal candidate score is achieved by determining a highest candidate score from the respective multiple candidate decisions.

5. A computing device comprising:
   a processing device; and
   memory including a resource coordination module which has instructions that are executed by the processing device, the instructions including the following logics:
      receiving multiple task types defined for a scenario and task priorities each task type representing a high level request used as a structure for a specific request to complete a task in the set of tasks,
      determining a current operating condition;
      defining a plurality of solutions for each task in the set of tasks based on the task type of each task;
      combining a respective solution associated with each task in the set of tasks to define a candidate decision for the set of tasks,
      determining a plurality of candidate decisions based on all possible combinations of the plurality of solutions for each task of the set of tasks;
      determining candidate scores for each of the plurality of candidate decisions, the candidate score being the sum of the scores of the plurality of solutions in the corresponding candidate decision comprising:
  determining the score for each solution in the respective candidate decision using a set of one to n criteria based on the task type of the task that the solution performs and applying weights to each criterion of each solution, wherein weights are based on a task priority assigned to the task associated with each solution and the current operating condition;
  determining an optimal candidate decision being the candidate decision of the plurality of candidate decisions with the overall highest score, and
  selecting and executing the determined optimal candidate decision for the current operating condition.

6. The computing device as defined in claim 5, wherein the resource coordination module further comprises penalizing a candidate score when negative conflicts are detected between the plurality of solutions and other conflicting tasks.

7. The computing device as defined in claim 5, wherein the resource coordination module further comprises rewarding a candidate score when positive interferences are detected between the plurality of solutions and other complementary tasks.

8. The computing device as defined in claim 5, wherein determining the optimal candidate score is achieved by determining a highest candidate score from the respective multiple candidate decisions.

9. The computing device as defined in claim 5, wherein the resource coordination module further comprises issuing the combined multiple solutions for the optimal candidate decision to a user.

10. A system having multiple computing devices, each of the computing devices comprising a processing device and memory including instructions that are executed by the processing device, the system comprising:
  a task repository module configured to receive multiple task types defined for a scenario and task priorities each task type representing a high level request used as a structure for a specific request to complete a task in a set of tasks based on a current operating condition;
  a resource bid engine configured to store multiple solutions associated with each task in the set of tasks; and
  a resource coordination optimization administrator configured to:
    combine a respective solution associated with each task of the set of tasks to define a candidate decision for the set of tasks,
    determine a plurality of candidate decisions based on all possible combinations of the plurality of solutions for each task of the set of tasks;
    determine candidate scores for each of the plurality of candidate decisions, the candidate score being the sum of the scores of the plurality of solutions in the corresponding candidate decision comprising:
      determining the score for each solution in the respective candidate decision using a set of 1 to n criteria based on the task type of the task that the solution performs and applying weights to each criterion of each solution, wherein weights are based on a task priority assigned to the task associated with each solution and the current operating condition;
    determine an optimal candidate decision being the candidate decision of the plurality of candidate decisions with the overall highest score, and
    select and execute the determined optimal candidate for the current operating condition.

11. The system as defined in claim 10, wherein the resource coordination optimization administrator further comprises penalizing a candidate score when negative conflicts are detected between the plurality of solutions and other conflicting tasks.

12. The system as defined in claim 10, wherein determining the optimal candidate score is achieved by determining a highest candidate score from the respective multiple candidate decisions.

* * * * *